No. 784,455. PATENTED MAR. 7, 1905.
G. B. WARREN.
FEED RACK AND MANGER.
APPLICATION FILED JULY 15, 1904.
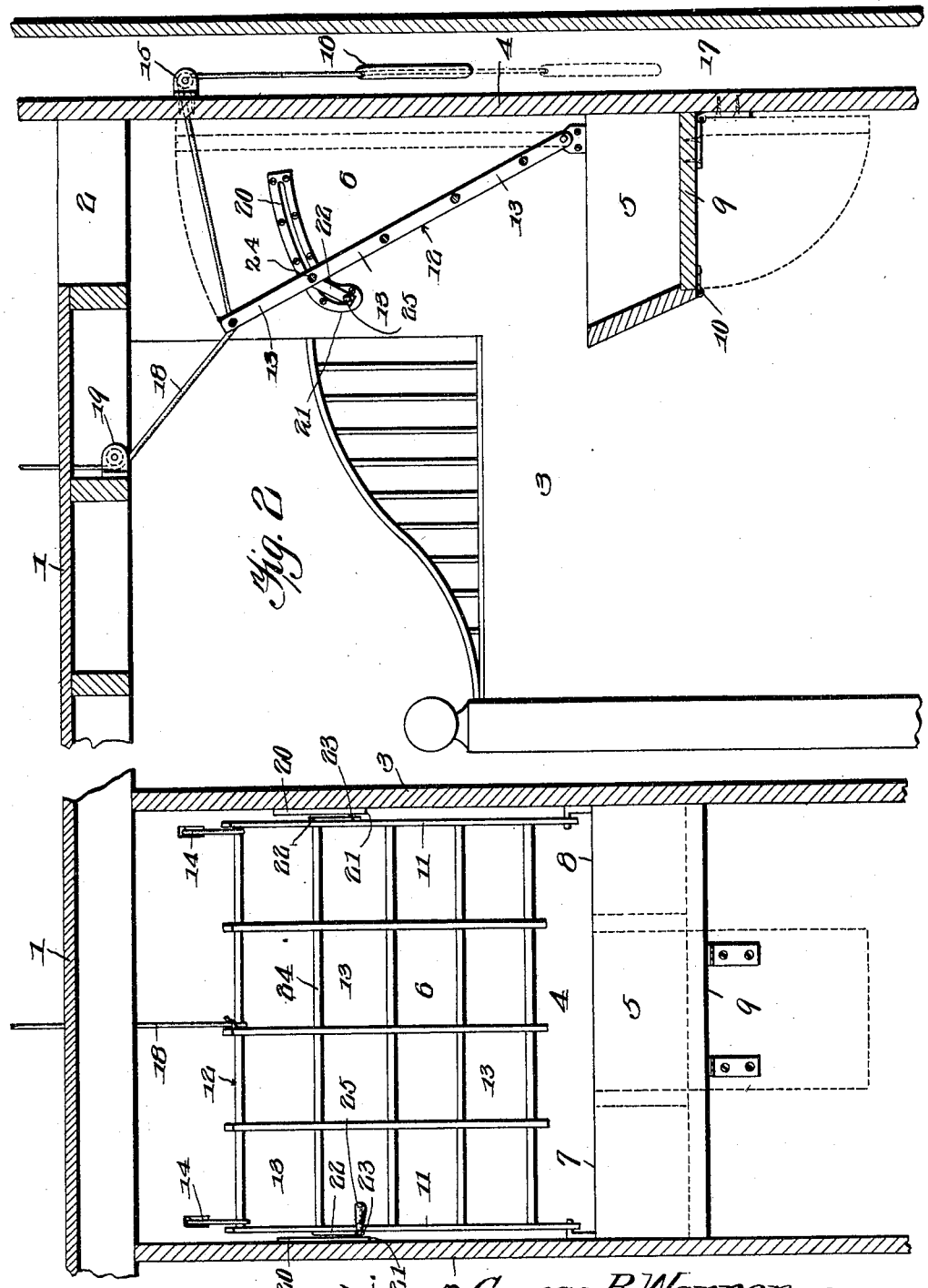
Witnesses
George B. Warren, Inventor.
by C. A. Snow & Co
Attorneys No. 784,455. Patented March 7, 1905.

UNITED STATES PATENT OFFICE.

GEORGE BURTRAM WARREN, OF SPOKANE, WASHINGTON.

FEED-RACK AND MANGER.

SPECIFICATION forming part of Letters Patent No. 784,455, dated March 7, 1905.

Application filed July 15, 1904. Serial No. 216,717.

*To all whom it may concern:*

Be it known that I, GEORGE BURTRAM WARREN, a citizen of the United States, residing at Spokane, in the county of Spokane and State of Washington, have invented a new and useful Feed-Rack and Manger, of which the following is a specification.

This invention relates to feed-racks for mangers, and has for its objects to produce a comparatively simple inexpensive device of this character which may be readily charged with feed and one wherein the hay or other material will be gradually delivered for the animal's consumption, thereby obviating rapid feeding on the part of the animal and wasting of the material.

With these and other objects in view the invention comprises the novel features of construction and combination of parts more fully hereinafter described.

In the accompanying drawings, Figure 1 is a front view of a stall or manger embodying the invention. Fig. 2 is a side sectional elevation of the same.

Referring to the drawings, 1 designates the floor of a hay-loft provided with a discharge or delivery opening 2; 3, the side walls, and 4 the rear wall, of a stall or manger constructed beneath the floor 1; 5, a feed-box sustained within the stall, and 6 a hay or feed rack pivoted above the box 5 and beneath the delivery-opening 2. The foregoing parts, except as hereinafter defined, may be of the usual or any appropriate construction and material.

The box 5, which is disposed beneath and adapted to receive particles of material which may escape from the rack 6, is provided at one end with a grain-compartment 7 and at the other end with a salt-compartment 8 and has a hinged or pivoted bottom 9, adapted to swing downward, as indicated in dotted lines in Fig. 2, to permit cleaning of the box, the bottom being normally maintained in operative position by means of a catch 10, while the rack 6, which is pivoted at its lower end immediately above the box 5 and adjacent to the wall 4 of the manger, comprises a pair of spaced side bars 11, designed to sustain an open-work frame 12, composed of intercrossed horizontal and vertical rods or elements appropriately spaced to produce openings or meshes 13, through which the material within the rack is accessible to an animal being fed and through which the material is drawn from the rack by the animal during the feeding operation. It may be observed that the front wall of the rack, formed by the open-work frame 12, when in operative or feeding position inclines upwardly and outwardly from the pivotal axis of the rack, thereby presenting the upper end or mouth of the latter beneath the opening 2, through which the hay or other feed is discharged from the loft into the rack, while the box 5 projects outwardly beneath the rack a sufficient distance to receive any loose material falling from the rack during the charging or feeding operations, thus obviating a loss of the material.

Attached, respectively, to the upper ends of the side bars 11 of the rack are cables or other flexible elements 14, which extend rearwardly over pulleys 15 and have attached to their inner free ends weights 16, designed to travel in vertical wells or channels 17, provided in the wall 4, these weights serving to return the rack to its inoperative or non-feeding position, while to the center of the upper bar of the frame 12 is attached a cable or other flexible element 18, extended over a pulley 19 and upward through the floor 1 into the hay-loft, it being apparent that through the medium of the element 18 the rack may be readily moved to open position to be filled with hay through the opening 2.

For guiding the rack in its movements and locking the same in open position while being charged I provide in the side walls 3 of the stall arcuate guide slots or ways 20, having their outer or forward ends curved at 21, curved rearwardly toward the wall 4, and fixed to the opposite ends of one of the horizontal rods of the frame 12 are locking members or links 22, having outturned portions or fingers 23 designed to engage and travel in the respective slots 20 and by engagement with the rearward curved portions 21 of the slots to lock the rack in position against rearward movement from pressure exerted thereon by the animal in feeding. The horizontal rod 24, which carries the links, is freely rotatable in the frame for pivoting the links to the latter, while one of the links has a knob 25 thereon to permit of its being lifted to throw its finger 23 out of engagement with the portion 21 of the slot, this action serving through the medium of the rod 24 likewise to lift the other or companion link.

In practice when the rack is moved outward to charging position through the medium of the member or element 18 the finger 23 of the locking members or links 22 travel downwardly and rearwardly in the portions 21 of the slots or ways, thereby temporarily locking the rack in its open or charging position. Material is then delivered from the loft through the opening 2 into the rack, and after the latter has been sufficiently filled the members 22 are actuated for releasing the rack, which the weights 16 will then have a tendency to return to normal or closed position, thus pressing the hay outward through the openings or meshes 13, whereby it will be readily accessible to the animal. As the material is consumed the rack moves gradually to closed position under the influence of the weights for constantly forcing the hay through the open-work frame, but gradually and in such quantities as to prevent rapid overfeeding of the animal and needless waste of the feed.

From the foregoing it is apparent that I produce a comparatively simple device admirably adapted for the attainment of the ends in view, it being understood that minor changes in the details herein set forth may be resorted to without departing from the spirit of the invention.

Having thus described the invention, what is claimed is—

1. In a device of the class described, a pivoted rack adapted to swing to operative and inoperative positions, means for locking the rack in operative position, and means operating automatically to move the rack to inoperative position when the locking means is released, thus to cause the material to be fed through the rack.

2. In a device of the class described, a fixed wall, a rack pivotally mounted adjacent thereto, means for moving the rack to operative position, means for temporarily holding the rack in this position and means operating automatically to move the rack to inoperative position.

3. In a device of the class described, a fixed wall, a rack movable toward and from the same, a floor above the rack having an opening for delivering material thereinto, means for moving the rack to receive a charge of feed, means for temporarily holding the rack in charging position and means for moving the rack toward the wall.

4. In a device of the class described, a fixed wall, an open-work rack movable to and from the same, means for guiding the rack in its movements and locking the same in its outward or open position, and means for feeding the rack inward toward the fixed wall when the locking means is released.

In testimony that I claim the foregoing as my own I have hereto affixed my signature in the presence of two witnesses.

GEORGE BURTRAM WARREN.

Witnesses:
A. W. HOLLAND,
A. K. HOLLAND.